United States Patent
Cabral, Jr. et al.

(10) Patent No.: US 9,970,102 B2
(45) Date of Patent: May 15, 2018

(54) ENERGY RELEASE USING TUNABLE REACTIVE MATERIALS

(71) Applicant: International Business Machines Corporation, Armonk, NY (US)

(72) Inventors: Cyril Cabral, Jr., Mahopac, NY (US); Gregory M. Fritz, Acton, MA (US); Kenneth P. Rodbell, Sandy Hook, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/017,944

(22) Filed: Feb. 8, 2016

(65) Prior Publication Data
US 2017/0226633 A1 Aug. 10, 2017

(51) Int. Cl.
| B32B 7/02 | (2006.01) |
| C23C 16/34 | (2006.01) |
| C23C 16/44 | (2006.01) |
| C23C 14/22 | (2006.01) |

(52) U.S. Cl.
CPC .............. *C23C 16/34* (2013.01); *C23C 14/22* (2013.01); *C23C 16/44* (2013.01)

(58) Field of Classification Search
CPC .......... C23C 16/34; C23C 14/22; C23C 16/44
USPC ................................................. 428/216, 699
See application file for complete search history.

(56) References Cited

U.S. PATENT DOCUMENTS

| 3,503,814 | A | | 3/1970 | Helms, Jr. et al. | |
| 3,798,011 | A | * | 3/1974 | Sharp, Jr. | B23K 20/08 |
| | | | | | 138/143 |
| 5,266,132 | A | * | 11/1993 | Danen | C06B 45/12 |
| | | | | | 149/15 |
| 5,606,146 | A | * | 2/1997 | Danen | C06B 45/12 |
| | | | | | 149/15 |
| 6,261,643 | B1 | * | 7/2001 | Hasz | C23C 4/02 |
| | | | | | 427/402 |
| 6,731,849 | B1 | * | 5/2004 | Singh | C03C 25/226 |
| | | | | | 204/192.12 |
| 7,278,354 | B1 | * | 10/2007 | Langan | C06B 45/14 |
| | | | | | 102/306 |
| 7,524,533 | B2 | * | 4/2009 | Garg | C23C 14/58 |
| | | | | | 427/250 |
| 7,755,935 | B2 | | 7/2010 | Lam et al. | |
| 7,951,247 | B2 | | 5/2011 | Barbee, Jr. et al. | |
| 8,105,859 | B2 | | 1/2012 | Breitwisch et al. | |
| 8,581,617 | B2 | | 11/2013 | Reese et al. | |
| 8,728,859 | B2 | | 5/2014 | Breitwisch et al. | |
| 8,735,865 | B2 | | 5/2014 | Minemura et al. | |

(Continued)

OTHER PUBLICATIONS

Fischer, S.H. et al. "A Survey of Combustible Metals, Thermites, and Intermetallics for Pyrotechnic Applications," presented at the 32nd AIAA/ASME/SAE/ASEE Joint Propulsion Conference (1996), pp. 1-13.

*Primary Examiner* — Maria V Ewald
*Assistant Examiner* — Travis M Figg
(74) *Attorney, Agent, or Firm* — Scully, Scott, Murphy & Presser, P.C.; Keivan Razavi

(57) ABSTRACT

A reactive material stack with tunable ignition temperatures is provided by inserting a barrier layer between layers of reactive materials. The barrier layer prevents the interdiffusion of the reactive materials, thus a reaction between reactive materials only occurs at an elevated ignition temperature when a certain energy threshold is reached.

13 Claims, 5 Drawing Sheets

(56) References Cited

U.S. PATENT DOCUMENTS

| | | |
|---|---|---|
| 8,773,919 B2 | 7/2014 | Miura et al. |
| 8,816,717 B2 | 8/2014 | Fritz et al. |
| 8,860,176 B2 | 10/2014 | Fritz et al. |
| 8,861,728 B2 * | 10/2014 | Chu ................... H01L 27/2436 257/E23.002 |
| 8,971,527 B2 | 3/2015 | BrightSky et al. |
| 9,078,294 B2 * | 7/2015 | Doumanidis .............. F24J 1/00 |
| 2001/0002297 A1 | 5/2001 | Schweizer et al. |
| 2005/0048305 A1 * | 3/2005 | Ackerman ............ C23C 28/322 428/544 |
| 2005/0079368 A1 * | 4/2005 | Gorman ................... C23C 4/02 428/469 |
| 2010/0099268 A1 * | 4/2010 | Timans ............. H01L 21/67115 438/761 |
| 2011/0226148 A1 | 9/2011 | Sawka |
| 2012/0039117 A1 | 2/2012 | Webb |
| 2013/0122259 A1 * | 5/2013 | Lee ......................... C23C 30/00 428/164 |
| 2014/0060648 A1 * | 3/2014 | Prasad .................... C23C 14/08 136/259 |
| 2014/0353808 A1 * | 12/2014 | Hosseini ........... H01L 23/49575 257/676 |
| 2016/0133280 A1 * | 5/2016 | Cheng ................ G11B 5/3106 369/13.33 |

* cited by examiner 10 nm Ni/Ta$_x$O$_y$/5 nm Ta/Ta$_x$O$_y$/5 nm Ta/Al$_2$O$_3$/Al/SiO$_2$/Si(100)

US 9,970,102 B2

ENERGY RELEASE USING TUNABLE REACTIVE MATERIALS

STATEMENT OF GOVERNMENT RIGHTS

This invention was made with Government support under Contract No.: N00014-12-C-0472 awarded by the Office of Navy Research. The Government has certain rights in this invention.

BACKGROUND

The present application relates to reactive material stacks, and more particularly to reactive material stacks with tunable ignition temperatures.

Reactive materials are a class of materials which can react to generate heat through a spontaneously exothermic reaction without producing gaseous products or generating a large pressure wave. Reactive materials are thus useful in a wide variety of applications requiring generation of intense, controlled amount of heat, including bonding, melting and microelectronics where the release of energy needed can be triggered by external ignition with, or without, a source of oxygen. For certain applications, it may be important that the energy stored in the reactive materials is not released until needed. For example and when employed as erasure elements to induce phase transformation of phase change materials of phase change memory (PCM) cells in an integrated circuit chip, the reactive materials need to be benign during the back end-of-line fabrication process (which typically requires annealing the chip at a temperature up to 400° C.) and normal chip operations, but can be ignited quickly when a triggering event occurs, e.g., when the chip is compromised (e.g., lost or stolen) and a possibility of a security breach could occur.

SUMMARY

The present application provides reactive material stacks with tunable ignition temperatures. By separating alternating layers of reactive materials from one another with a barrier layer, the interdiffusion of metal elements of the reactive materials is prevented. The reactive material stacks thus remain unreacted until a high energy threshold is reached.

In one aspect of the present application, a reactive material stack is provided. The reactive material stack includes alternating layers of a first reactive material and a second reactive material and a barrier layer located between the layers of the first reactive material and the second reactive material, wherein the barrier layer comprises a transition metal, an oxide thereof, a nitride thereof, aluminum oxide ($Al_xO_y$) or a combination thereof.

In another aspect of the present application, a method of forming a reactive material stack is provided.

In one embodiment, the method includes forming a layer of a first reactive material over a substrate, forming a barrier layer over the layer of the first reactive material, forming a layer of a second reactive material over the barrier layer, forming another barrier layer over the layer of the second reactive material and repeating the forming of the layer of the first reactive material, the forming of the barrier layer, the forming of the second reactive material, and the forming of the another barrier layer to provide a desired thickness for the reactive material stack.

In another embodiment, the method includes forming a layer of a first reactive material over a substrate, forming a layer of a second reactive material over the layer of the first reactive material, forming a barrier layer over the layer of the second reactive material, and repeating the forming of the layer of the first reactive material, the forming of the second reactive material, and the forming of the barrier layer to provide a desired thickness for the reactive material stack.

DETAILED DESCRIPTION

Figure 1:
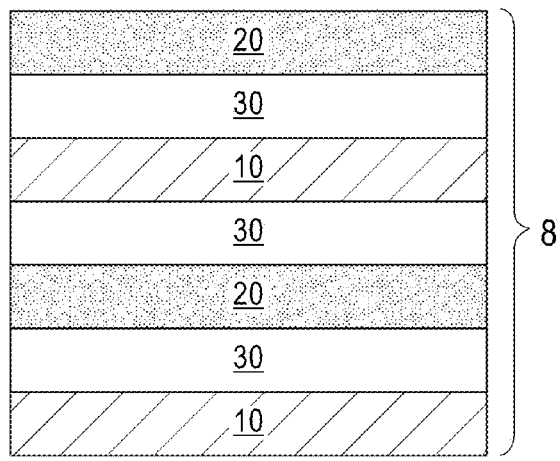
FIG. 1 is a cross-sectional view of an exemplary reactive material stack that can be employed in an embodiment of the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Referring to FIG. 1, there is illustrated a reactive material stack 8 that can be employed in an embodiment of the present application. The reactive material stack 8 includes alternating layers of a first reactive material 10 and a second reactive material 20, and a barrier layer 30 sandwiched between each layer of the first reactive material 10 and the second reactive material 20. The reactive material stack 8 typically contains tens to about one hundred of these layers and has a total thickness from 0.5 µm to 10 µm, although greater or lesser thicknesses may be contemplated.

The reactive material stack 8 can be formed over a substrate (not shown). The substrate can be a semiconductor substrate, a dielectric substrate, a conductive material substrate, or a combination thereof. In one embodiment, the substrate can include a bulk semiconductor substrate, a semiconductor-on-insulator (SOI) substrate or a III-V semiconductor substrate as known in the art. The substrate may also include metal lines and/or metal via structures embedded within at least one dielectric material layer.

The first reactive material and the second reactive material are selected to react with one another in an exothermic reaction upon ignition. In one embodiment, such exothermic reaction produces sufficient heat to cause the alteration to the memory state of phase change memory (PCM) cells in integrated circuits. Exemplary sets of the first reactive material and second reactive material include, but are not limited to, Ni/Al, Al/Pd, Cu/Pd, Nb/Si and Ti/Al. Additional exemplary sets of the first and second reactive materials that may be used in embodiments of the present application are described in "A Survey of Combustible Metals, Thermites, and Intermetallics for Pyrotechnic Applications", by Fischer et al., 32nd AIAA/ASME/SAE/ASEE Joint Propulsion Conference, Lake Buena Vista, Fla., 1996, the disclosure of which is hereby incorporated by reference in its entirety.

The reaction of the first and second reactive materials may be ignited by a mechanical stress, an electric spark, a laser pulse, or other similar energy ignition sources. Upon ignition, metal elements of the first reactive material and second reactive material intermix due to atomic diffusion to form an alloy, intermetallic or a composite of the first reactive material and the second reactive material. The change in chemical bonding, caused by interdiffusion and compound formation, generates heat in an exothermic chemical reaction.

The layers of the first and second reactive materials 10, 20 may be formed using conventional film deposition techniques such as, for example, physical vapor deposition (PVD) or chemical vapor deposition (CVD), atomic layer deposition (ALD), electroplating and spin-on (sol-gel) processing. The thickness of each layer of the first reactive material 10 and the second reactive material 20 may range from 1 nm to 200 nm, although lesser or greater thicknesses can also be employed. The thickness of the layers may be a constant or some layers may have a different thickness than others.

Figure 2:
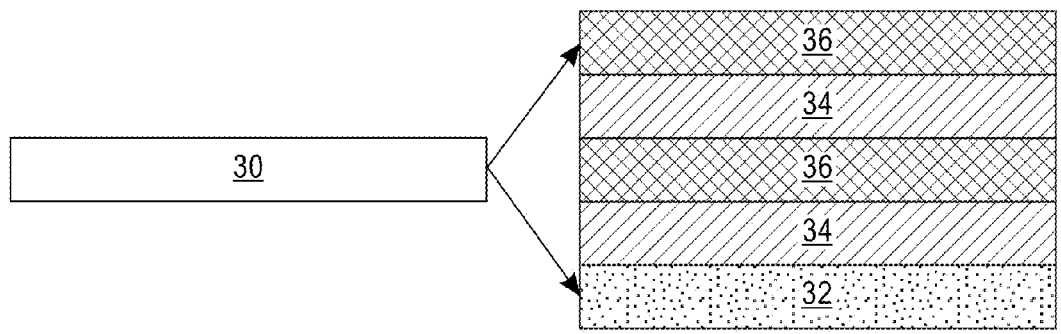
FIG. 2 is a cross-sectional view illustrating a barrier layer stack that can be employed in the exemplary reactive material stack of the present application.

Each barrier layer 30 acts as a diffusion barrier to reduce interdiffusion of the first and second reactive materials, thus preventing the reactions from taking place until a triggering event designated to initiate the reaction occurs. Each barrier layer 30 may include transition metals selected from Group IVB or VB of the Period Table of Elements, oxides of these transition meals, nitrides of these transition meals, aluminum oxide ($Al_xO_y$ with x from 1 to 2 and y from 1 to 3) or combinations thereof. Exemplary transition metals include, but are not limited to, Ti, Zr, Hf, V, Nb and Ta. Each barrier layer 30 may be formed of a single layer structure or a multilayer stack (as shown in FIG. 2). In one embodiment, each barrier layer 30 includes a single layer of Ta. In another embodiment, each barrier layer 30 includes a stack selected from the group consisting of Ta/$Ta_xO_y$, $Al_xO_y$/Ta/$Ta_xO_y$ or $Al_xO_y$/Ta/$Ta_xO_y$/Ta/$Ta_xO_y$. For example and as shown in FIG. 2, each barrier layer 30 includes a five-layer stack of $Al_xO_y$ (labeled as 32 in the drawing) and alternating layers of Ta (labeled as 34 in the drawing) and $Ta_xO_y$ (labeled as 36 in the drawing) with x from 1 to 3 and y from 1 to 5. It should be noted that the number of alternating layers in the barrier layer stack is not limited to four layers as shown in FIG. 2, other numbers of alternating layers can also be employed in the barrier layer stack. The thickness of each barrier layer 30 may be from 1 nm to 20 nm, although lesser and greater thicknesses can also be employed.

The barrier layers 30 may be formed, for example, by PVD, CVD, ALD, electroplating or spin-on (sol-gel) processing. In one embodiment and when transition metal oxides or metal nitrides are employed in the barrier layer 30, the transition metal oxide layer or the transition metal nitride layer may be formed by first forming a transition metal layer and converting a surface portion of the transition metal layer by thermal nitridation and/or thermal oxidation.

Figure 3:
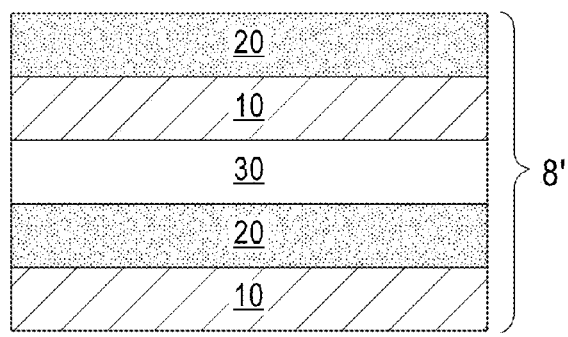
FIG. 3 is a cross-sectional view of another exemplary reactive material stack that can be employed in another embodiment of the present application.

Referring to FIG. 3, there is illustrated another reactive material stack 8' that can be employed in another embodiment of the present application. The reactive material stack 8' includes alternating layers of a first reactive material 10 and a second reactive material 20, and a barrier layer 30 sandwiched between each pair of the layer of the first reactive material 10 and the layer of the second reactive material 20. Each layer is composed of the same material and can be formed by the same method as described above in FIG. 1.

The energy required to initiate the exothermic reaction is directly related to the physical properties, e.g., thickness and the composition of each barrier layer 30. To illustrate the effects of the barrier layer 30 on the ignition temperatures of the reactive material stack 8 of the present application, a barrier layer or a barrier layer stack of the present application is introduced between an Al layer and a Ni layer. In a first example and when a single barrier layer is employed, a first exemplary reactive material stack of the present application includes, from bottom to top, 20 nm Al/10 nm Ta/10 nm Ni formed over a $SiO_2$ coated Si substrate. In a second example and when a barrier layer stack is employed, a second exemplary reactive material stack includes, from bottom to top, 20 nm Al/$Al_xO_y$/5 nm Ta/$Ta_xO_y$/5 nm Ta/$Ta_xO_y$/10 nm Ni formed over a $SiO_2$ coated Si substrate. The oxide layers in the second example were formed by exposing the structure to an air break after deposition of each metal layer. The ignition temperatures obtained from the first and second exemplary reactive material stacks are compared with a conventional reactive material stack composed a bilayer of 20 nm Al and 10 nm Ni formed over a $SiO_2$ coated Si substrate.

Figure 4A:
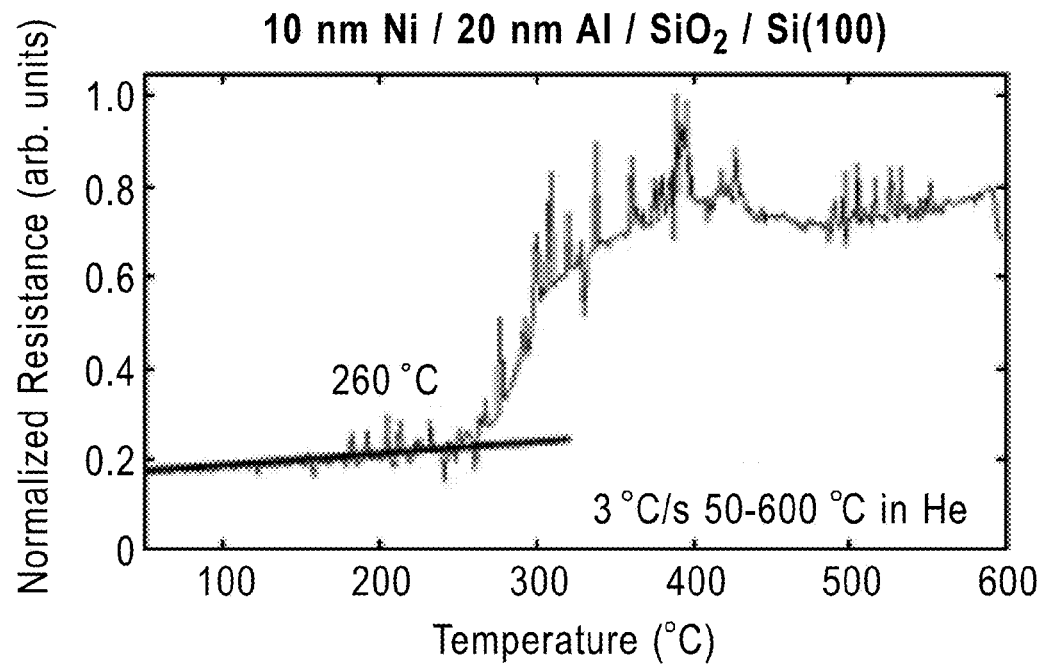
FIG. 4A shows a graph of sheet resistance versus temperature for a conventional reactive material stack including a bilayer of Al/Ni formed over a $SiO_2$ coated substrate.
Figure 4B:
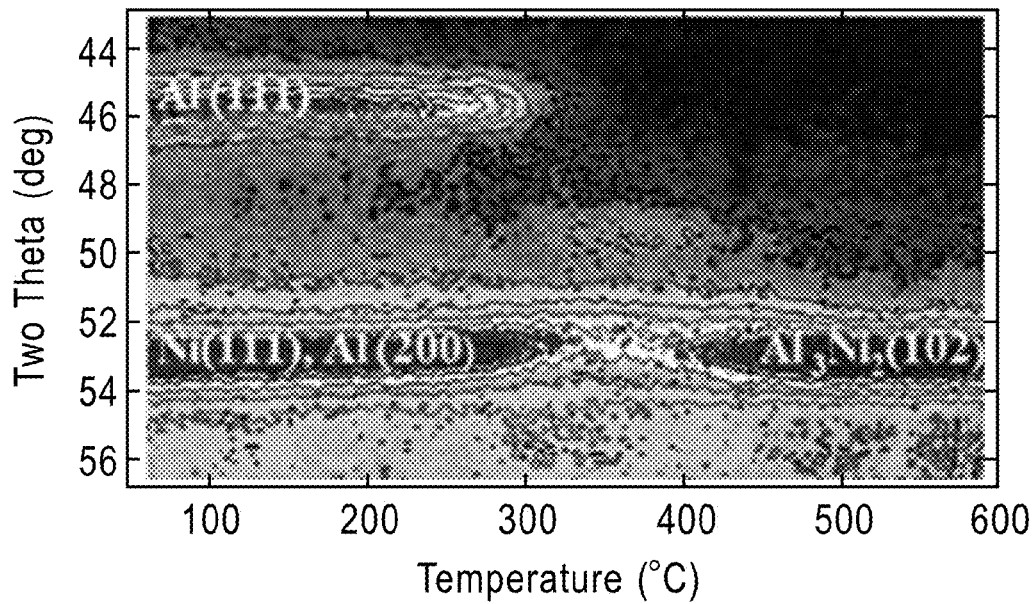
FIG. 4B shows a X-ray diffraction (XRD) profile of the conventional reactive material stack.

FIG. 4A shows a sheet resistance of the conventional reactive material stack as a function of temperature and FIG. 4B shows a X-ray diffraction (XRD) profile of the conventional reactive material stack as a function of temperature at a heating rate of 3° C./s in a helium ambient. As shown in FIG. 4A, the sheet resistance initially increases linearly with increasing of temperature but deviates from linearity at about 260° C., indicating that at about 260° C. the reaction between Al and Ni proceeds to form an $Al_3Ni_2$ alloy. The phase change at about 260° C. is also evidenced in the XRD profile. As shown in FIG. 4B, phases of Al and Ni disappear while a new $Al_3Ni_2$ phase appears after heating to 260° C. Thus, both sheet resistance and XRD measurements indicate that a temperature of 260° C. at a ramp rate of 3° C./scan trigger the reaction of Al and Ni.

Figure 5A:
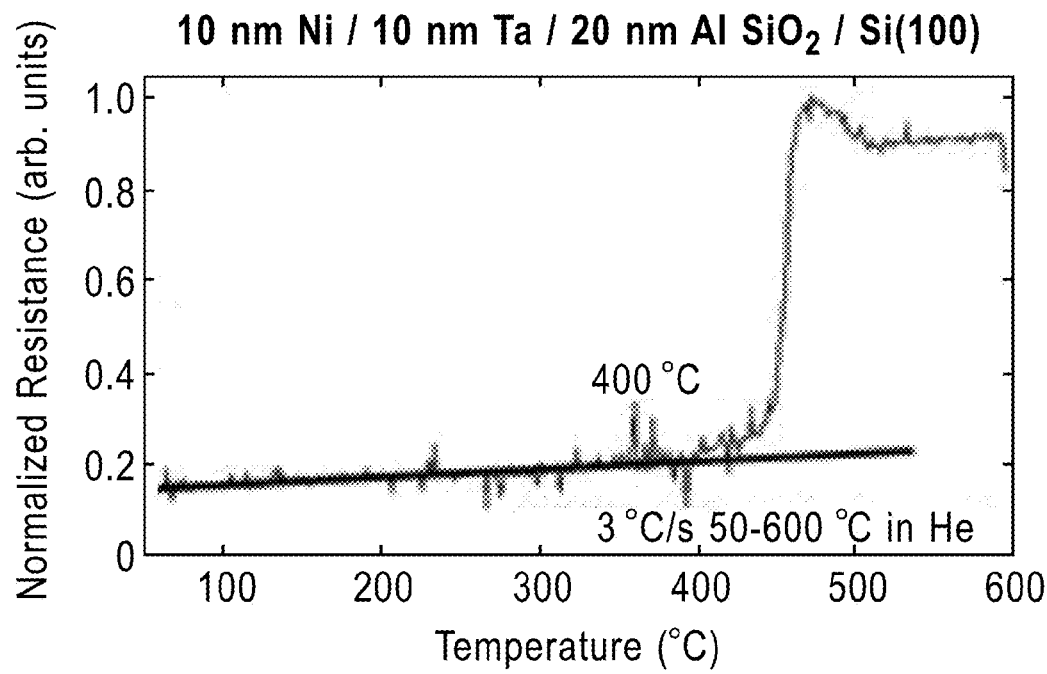
FIG. 5A shows a graph of sheet resistance versus temperature for a first exemplary reactive material stack that includes a single barrier layer sandwiched between an Al layer and a Ni layer according to a first example of the present application.
Figure 5B:
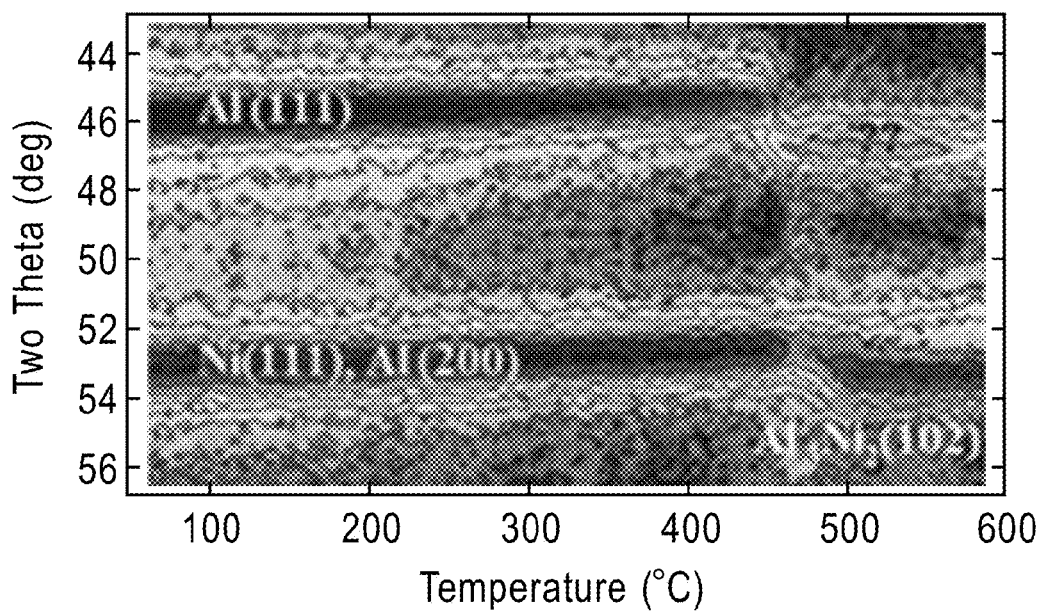
FIG. 5B shows a XRD profile of the first exemplary reactive material stack.

FIG. 5A shows a sheet resistance of the first exemplary reactive material stack of the present application as a function of temperature and FIG. 5B shows a XRD profile of the first exemplary reactive material stack as a function of temperature at a heating rate of 3° C./s in a helium ambient. As shown in FIG. 5A, the sheet resistance initially increases linearly with increasing of temperature but deviates from linearity at about 400° C., indicating that at about 400° C. the reaction between Al and Ni proceeds to form an $Al_3Ni_2$ alloy. The phase change at 400° C. is also evidenced in the XRD profile. As shown in FIG. 5B, phases of Al and Ni disappear while a new $Al_3Ni_2$ phase appears after heating to 400° C. This means that a reaction temperature of 260° C. is not sufficient to trigger the reaction of Al and Ni when a Ta barrier layer is present therebetween, but rather a temperature above 400° C. is needed. Thus, by introducing a 10 nm Ta barrier layer between the Al layer and Ni layer, the reaction temperature for Al and Ni couples can be increased to 400° C.

Figure 6A:
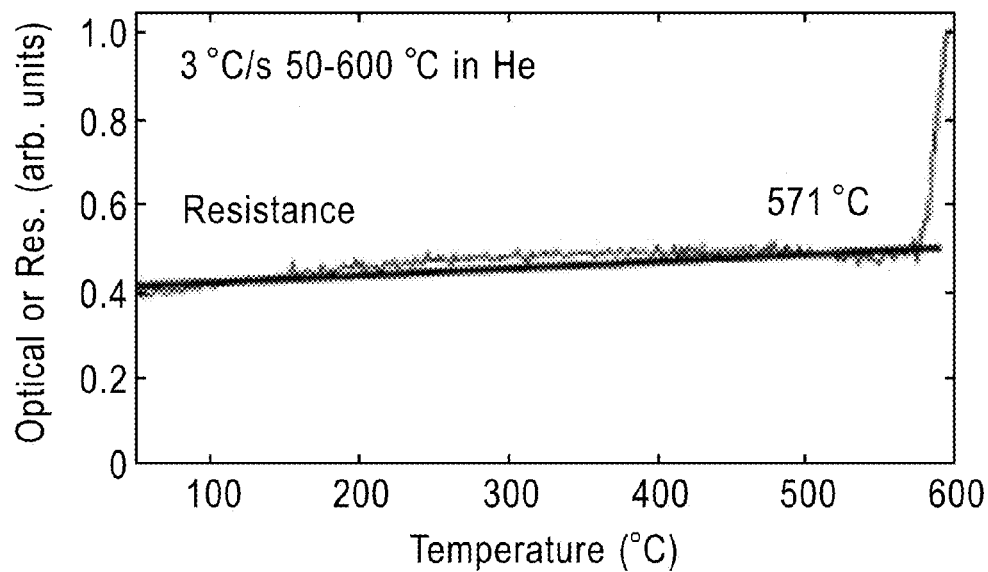
FIG. 6A shows a graph of sheet resistance versus temperature for a second exemplary reactive material stack that includes a barrier layer stack sandwiched between an Al layer and a Ni layer according to a second example of the present application.
Figure 6B:
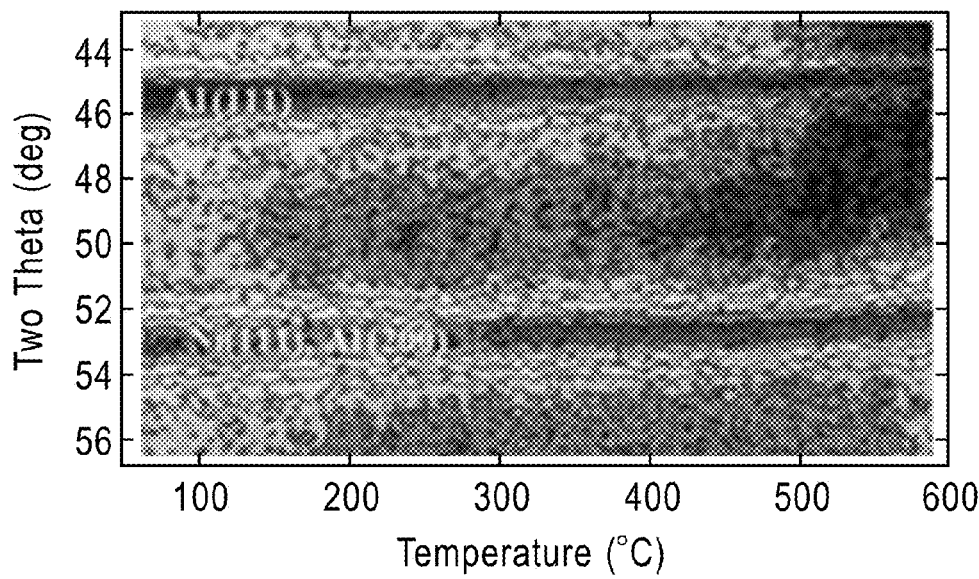
FIG. 6B shows a XRD profile of the second exemplary reactive material stack.

FIG. 6A shows a sheet resistance of the second exemplary reactive material stack of the present application as a function of temperature and FIG. 6B shows a XRD profile of the second exemplary reactive material stack as a function of temperature at a heating rate of 3° C./s in a helium ambient. As shown in FIG. 6A, the sheet resistance initially increases linearly with increasing of temperature, but deviates from linearity at about 571° C., indicating that at about 571° C. the reaction between Al and Ni proceeds to form an $Al_3Ni_2$ alloy. The phase change is also evidenced in the XRD profile. As shown in FIG. 6B, phases of Al and Ni remains at a temperature around 571° C. Thus, by introducing a barrier layer stack between the Al layer and Ni layer, the reaction temperature for Al and Ni couples can be increased to 571° C.

Figure 6C:
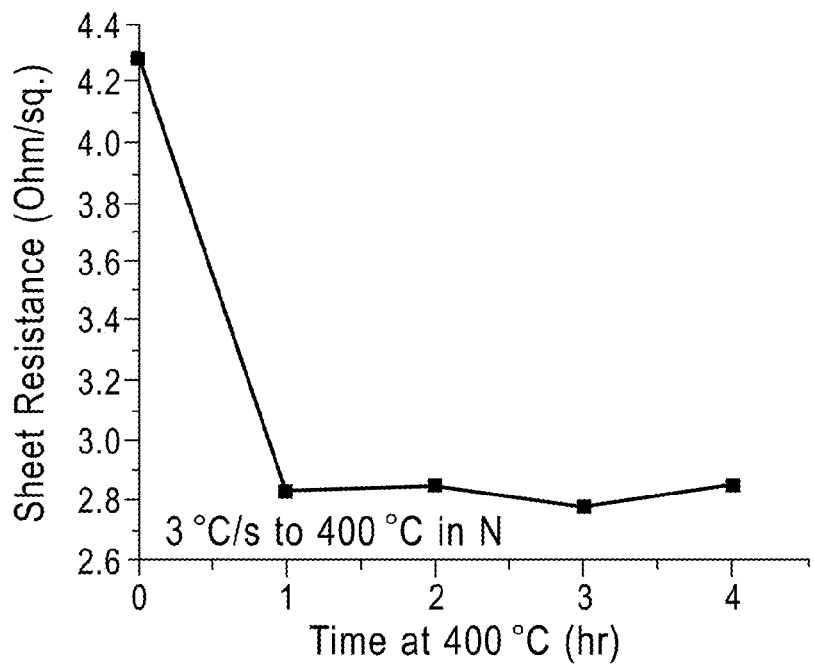
FIG. 6C shows a graph of sheet resistance versus heating time for the second exemplary reactive material stack.

FIG. 6C shows an sheet resistance of the second exemplary reactive material stack as a function of heating time when the second exemplary reactive material stack is held isothermally at 400° C. for 4 h. As shown in FIG. 6C, there is no increase in sheet resistance as time passes, indicating that the reaction between Al and Ni does not occur at 400° C.

Figure 7:
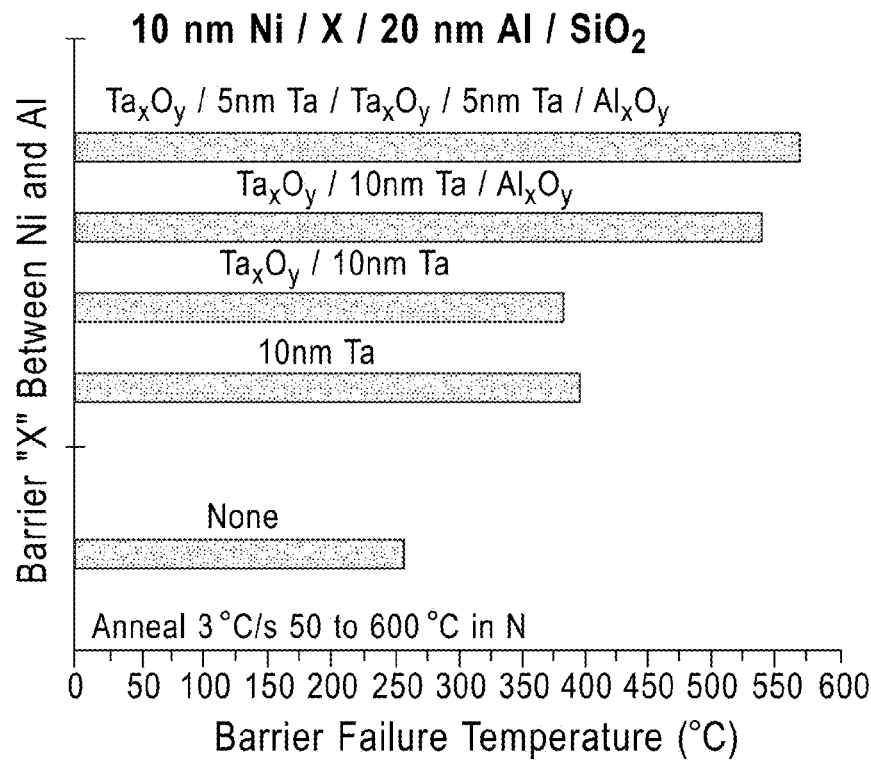
FIG. 7 is a bar graph showing effects of barriers layers on ignition temperatures of a Ni—Al reactive material pair.

FIG. 7 is a graph summarizing ignition temperatures of reactive material stacks employing various barrier layers of the present application. Each reactive material stack has a structure represent by 10 nm Ni/X/20 nm Al/$SiO_2$, and X represents a barrier layer of the present application. As shown in FIG. 7, by varying the composition and thickness of the barrier layers, the reaction temperature of the reactive material stacks including Al and Ni reactive material pairs can be tailored to be from 260° C. to 571° C.

In the present application, by introducing a barrier layer between layers of the first reactive material and second reactive material, the ignition temperature of resulting reactive material stacks can tuned. The reactive material stacks thus formed are benign during the chip fabrication and chip operation, but can be ignited when a triggering event occurs at a desired time. Further, by varying composition and thickness of the barrier layer of the present application, the ignition temperatures of the reactive material stacks can be tuned. The design flexibility can be greatly improved.

While the application has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the application is intended to encompass all such alternatives, modifications and variations which fall within the scope and spirit of the application and the following claims.

What is claimed is:

1. A reactive material stack comprising:
   alternating layers of a first reactive material and a second reactive material; and
   a barrier layer located between the layers of the first reactive material and the second reactive material, wherein the barrier layer comprises a stack of, from bottom to top, $Al_xO_y$/Ta/$Ta_xO_y$, wherein x is from 1 to 3 and y is from 1 to 5.

2. The reactive material stack of claim 1, wherein the barrier layer is located between each layer of the first reactive material and the second reactive material.

3. The reactive material stack of claim 1, wherein the barrier layer is located between each pair of the layers of the first reactive material and the second reactive material.

4. The reactive material stack of claim 1, wherein the first reactive material and the second reactive material comprise material sets that react with one another in an exothermic reaction upon ignition and are selected from Ni and Al, Al and Pd, Cu and Pd, Nb and Si, and Ti and Al.

5. The reactive material stack of claim 1, wherein each of the layers of the first reactive material and the second reactive material has a thickness from 1 nm to 200 nm, and the barrier layer has a thickness from 1 nm to 20 nm.

6. The reactive material stack of claim 1, wherein the reactive material stack has a total thickness from 0.5 μm to 10 μm.

7. The reactive material stack of claim 1, wherein the first reactive material and the second reactive material reacts with each other, but not with the barrier layer, to form an alloy or a composite consisting of the first reactive material and the second reactive material.

8. A reactive material stack comprising:
   alternating layers of a first reactive material and a second reactive material; and
   a barrier layer located between the layers of the first reactive material and the second reactive material, wherein the barrier layer comprises a stack of, from bottom to top, $Al_xO_y$/Ta/$Ta_xO_y$/Ta/$Ta_xO_y$, wherein x is from 1 to 3 and y is from 1 to 5.

9. The reactive material stack of claim 8, wherein the barrier layer is located between each layer of the first reactive material and the second reactive material.

10. The reactive material stack of claim 8, wherein the barrier layer is located between each pair of the layers of the first reactive material and the second reactive material.

11. The reactive material stack of claim 8, wherein the first reactive material and the second reactive material comprise material sets that react with one another in an exothermic reaction upon ignition and are selected from Ni and Al, Al and Pd, Cu and Pd, Nb and Si, and Ti and Al.

12. The reactive material stack of claim 8, wherein each of the layers of the first reactive material and the second reactive material has a thickness from 1 nm to 200 nm, and the barrier layer has a thickness from 1 nm to 20 nm.

13. The reactive material stack of claim 8, wherein the reactive material stack has a total thickness from 0.5 μm to 10 μm.

* * * * *